UNITED STATES PATENT OFFICE.

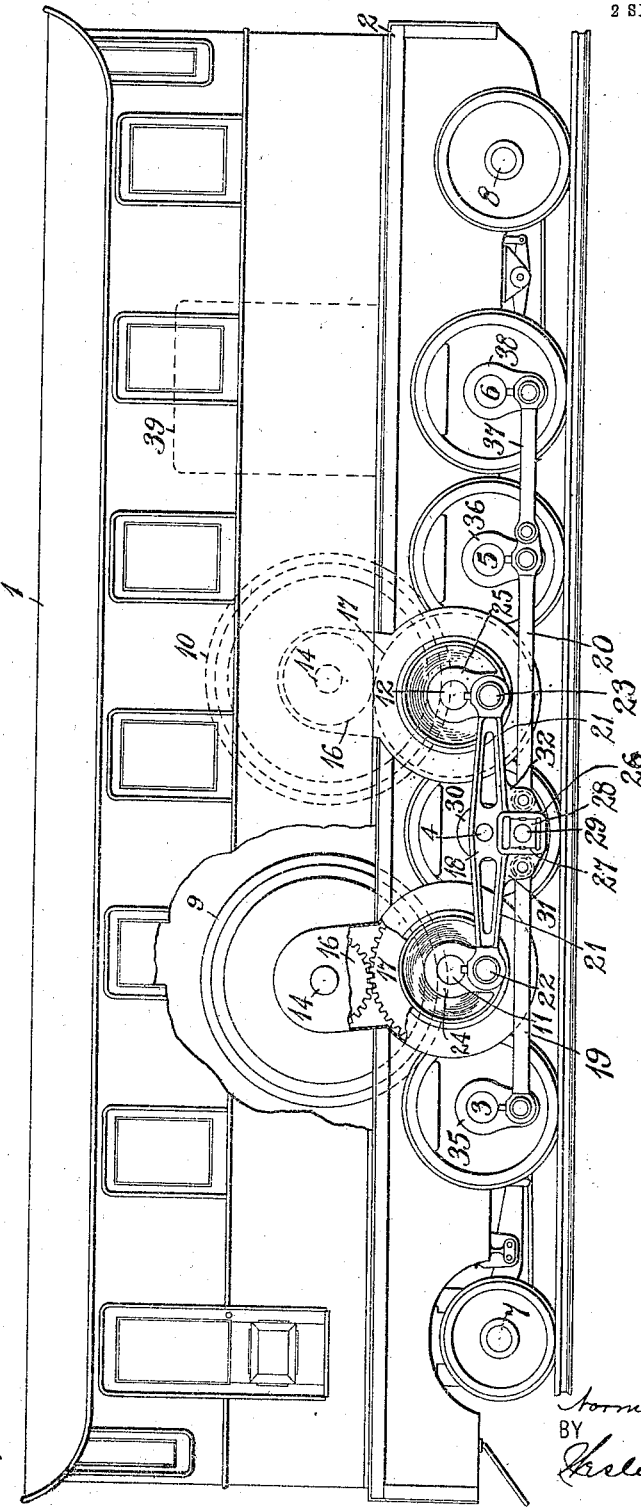

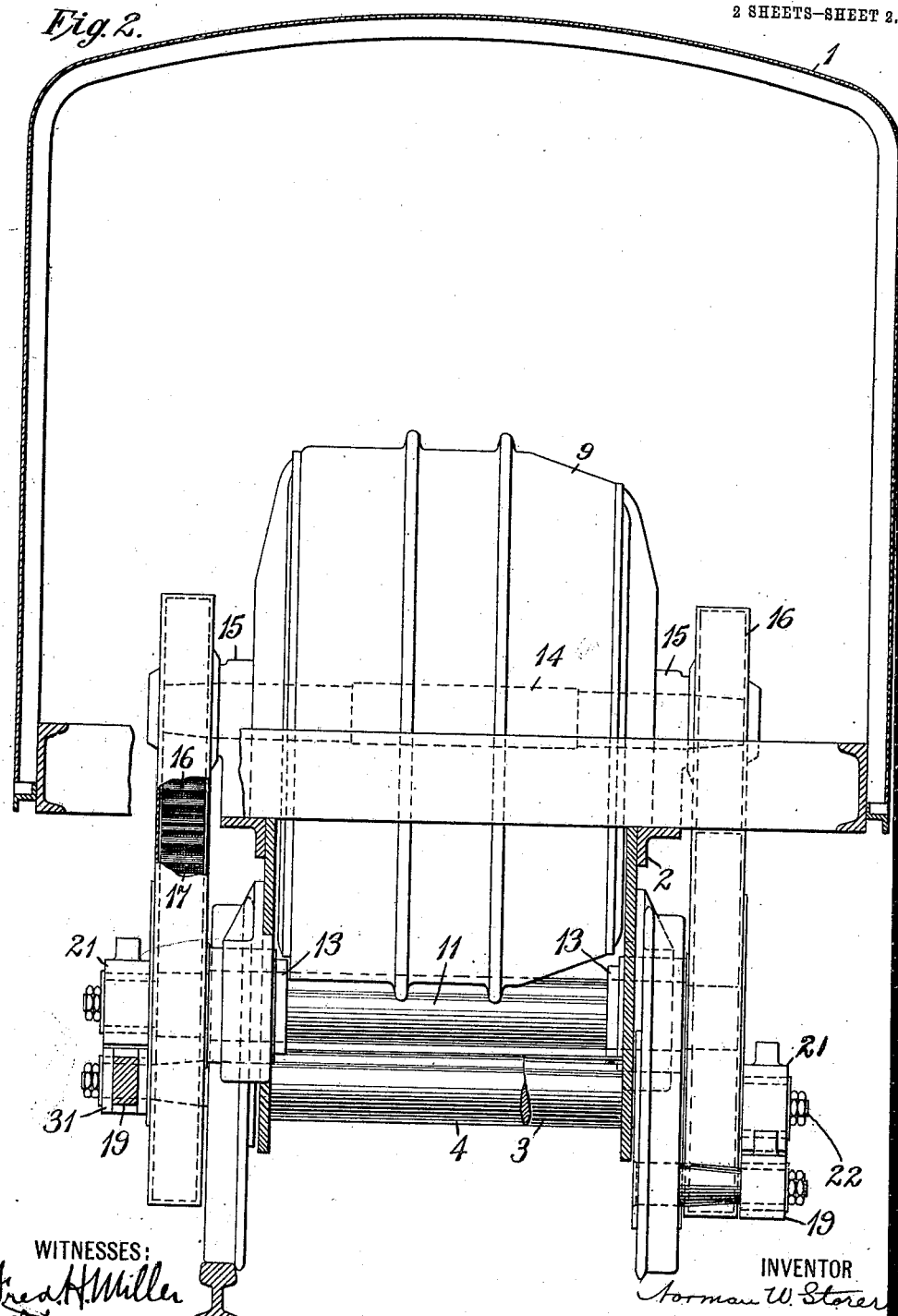

NORMAN W. STORER, OF PITTSBURG, PENNSYLVANIA, ASSIGNOR TO WESTINGHOUSE ELECTRIC AND MANUFACTURING COMPANY, A CORPORATION OF PENNSYLVANIA.

ELECTRIC LOCOMOTIVE.

991,038.     Specification of Letters Patent.     Patented May 2, 1911.

Application filed January 3, 1910. Serial No. 536,165.

*To all whom it may concern:*

Be it known that I, NORMAN W. STORER, a citizen of the United States, and a resident of Pittsburg, in the county of Allegheny and State of Pennsylvania, have invented a new and useful Improvement in Electric Locomotives, of which the following is a specification.

My invention relates to electrically propelled vehicles and particularly to electric locomotives having driving motors of relatively large size.

The object of my invention is to provide a relatively simple and economical driving connection between two or more electric motors which are mounted on the body frame of a locomotive or other vehicle, and the driving wheels thereof.

When only a small number of very large and heavy driving motors are employed for powerful electric locomotives, it is particularly desirable to place the motors near the center of the locomotive, in order to avoid, as far as possible, oscillation of the cab. It is also desirable to provide such an operative driving connection between the motors and the axles that a relative adjustment between the connected parts is permitted in order that the motors may be rigidly secured to the vehicle body frame which is resiliently supported on the truck axles.

According to my present invention, I provide a driving connection which is specially adapted for connecting two large driving motors to several driving axles that are below, and one of which is between, the two motors.

My novel connection involves the use of two jack shafts which are rotatably supported almost directly below the motor axles to which they are respectively gear-connected.

Figure 1 of the accompanying drawings is an elevation of an electric locomotive having a driving connection arranged and constructed in accordance with my invention, and Fig. 2 is a partially sectional end elevation of the vehicle shown in Fig. 1.

Referring to the drawings, the locomotive here shown comprises a cab 1, a body frame 2 on which the cab is mounted, a plurality of axles 3, 4, 5 and 6 to which driving wheels are secured, each driving axle with its wheels being hereinafter referred to, for convenience, as a "driving wheel-axle", and two pony-truck axles 7 and 8 having wheels of relatively small size attached to them. The pony-truck axles with their wheels are designated as "truck wheel-axles".

A pair of driving motors 9 and 10 are supported directly from the body frame 2 of the locomotive and are disposed above and between the driving wheel-axles 3, 4 and 5. Jack shafts 11 and 12 are rotatably supported in suitable bearings 13 which are secured to the frame 2 and they are located at approximately equal distances on opposite sides of the intermediate driving wheel axle 4 and slightly above it, their center lines being almost directly below and parallel to the shafts of the motors 9 and 10. The rotating parts of the motors are provided with shafts 14 which are supported in bearings 15 and are operatively connected to the jack shafts 11 and 12 by means of pinions 16 secured upon the ends of the motor shafts, and gears 17 that are similarly attached to the outer ends of the jack shafts.

The jack shafts 11 and 12 are connected to the driving wheel-axle 4 by means of scotch-yokes 18, and the driving connection is carried to the driving wheel-axles 3 and 5 by means of side rods 19 and 20. Each of the scotch-yokes 18 comprises a connecting rod 21 having a downwardly extending projection 26 that is provided with a rectangular recess 27 in which a bearing block 28 is adjustably supported. The ends of the rods 21 are respectively pivoted upon pins 22 and 23 of cranks 24 and 25 which are integral with the gears 17. The blocks 28 are rotatably supported upon pins 29 which project outwardly from cranks 30 of the wheel axle 4, and the scotch-yokes are further provided with ears 31 and 32 to which the adjacent ends of the side rods 19 and 20 are pivotally connected. The driving wheel centers are formed to constitute cranks 30, 35 and 36, the opposite ends of the side rods being connected to the cranks 35 and 36.

The side rods 20 extend slightly beyond the cranks 36 and are pivotally connected to side rods 37, which are, in turn, connected to cranks 38 of the driving wheel-axle 6. The cranks in opposite sides of the locomotive preferably bear a quadrature relation in order to permit the locomotive to be started readily from any position of rest.

The locomotive cab 1 and the body frame 2 on which the motors are mounted are resiliently supported upon the pony-truck and the driving wheel axles in the usual manner, and, consequently, it is essential to provide such a driving connection between the motors and the wheels that a relative adjustment is permitted. In the arrangement shown, the adjustable connection between the bearing block 28 and the projection 26 of the scotch-yoke is well adapted to permit the adjustment desired, while, at the same time, the weight of the motors can be advantageously distributed. In order to permit of the use of very large motors, I have located the gears 17 outside of the planes of the driving wheels instead of following the usual practice of placing them inside of the wheels. This arrangement has the additional advantage that the gear widths may easily be made adequate for the transmission of very large forces. It is also apparent that the relative position of the jack shafts and the motor axles may readily be adjusted to accommodate pinions of relatively large diameters which operate more satisfactorily than small pinions, which are often necessary when the space is restricted, in order to obtain the desired gear ratio.

My driving connection may be employed with one or more driving axles, but the arrangement shown in which there are four driving axles is particularly well adapted for alternating current driving motors of large size, since the transformer 39 which is usually carried on the vehicle may be located almost directly over one of the axles while the weight of the motors may be distributed over the other three driving axles, the pony-trucks taking a relatively small percentage of the load, as is usual in railway vehicles of this type.

By connecting the rods 19 and 20 to the rod 21, as shown in the drawings, the forces transmitted through the sliding blocks 28 are confined to those required for the driving wheel-axle 30 alone.

As shown in Fig. 2 of the drawings, complete driving connections are established on each side of the vehicle, but, in some cases, it may be found desirable to provide driving gears and pinions only at one end of the motor.

It is evident that various structural modifications may be effected within the spirit and scope of my invention.

I claim as my invention:

1. In an electric locomotive, the combination with a body frame having a driving wheel-axle and a pair of jack-shafts rotatably mounted on the frame and disposed at the respective sides of the driving-axle and slightly above it, of a driving-motor geared to one of the jack-shafts, and scotch-yoke connections between the jack-shafts and the driving wheel-axle.

2. In an electric locomotive, the combination with a body frame and a truck having a plurality of driving wheel-axles and a pair of jack-shafts rotatably supported by the frame and disposed at opposite sides of an intermediate driving wheel-axle and above the plane of said wheel-axles, of a plurality of driving motors geared to the jack-shafts, and a connection between the jack-shafts and the driving wheel-axles, whereby the frame may be resiliently supported on the axles.

3. In an electric locomotive, the combination with a body frame and a truck having a plurality of driving wheel-axles and a pair of jack-shafts disposed parallel to, and at substantially equal distances at opposite sides of a driving wheel-axle and in a plane substantially parallel to and above the plane of the driving wheel-axles, of a pair of driving motors respectively geared to the jack-shafts and a scotch yoke connection between the jack-shafts and the intermediate driving wheel-axles, the body frame being resiliently supported on the truck.

4. In an electric locomotive, the combination with a body frame and a truck having a plurality of driving wheel-axles and a pair of jack-shafts disposed parallel to, and at substantially equal distances on opposite sides of an intermediate driving wheel-axle and above the plane of the wheel-axle, of a pair of driving motors respectively geared to the jack-shafts and a scotch-yoke connection between the jack-shafts and the intermediate driving wheel-axle, the body frame being resiliently supported on the truck and said gears being located entirely outside of the planes of the wheels.

In testimony whereof, I have hereunto subscribed my name this 24th day of Dec., 1909.

NORMAN W. STORER.

Witnesses:
  REX H. NEWTON,
  B. B. HINES.